(12) United States Patent
Yamamoto

(10) Patent No.: US 12,463,567 B2
(45) Date of Patent: Nov. 4, 2025

(54) MOTOR CONTROL DEVICE, MOTOR CONTROL METHOD, AND A NON-TRANSITORY STORAGE MEDIUM STORING A MOTOR CONTROL PROGRAM FOR A MOTOR CONTROL DEVICE

(71) Applicant: MINEBEA MITSUMI Inc., Nagano (JP)

(72) Inventor: Takahiro Yamamoto, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 228 days.

(21) Appl. No.: 18/551,629

(22) PCT Filed: Mar. 9, 2022

(86) PCT No.: PCT/JP2022/010347
§ 371 (c)(1),
(2) Date: Sep. 21, 2023

(87) PCT Pub. No.: WO2022/202331
PCT Pub. Date: Sep. 29, 2022

(65) Prior Publication Data
US 2024/0171098 A1 May 23, 2024

(30) Foreign Application Priority Data
Mar. 23, 2021 (JP) .................. 2021-049016

(51) Int. Cl.
*H02P 8/32* (2006.01)
(52) U.S. Cl.
CPC ...................... *H02P 8/32* (2013.01)
(58) Field of Classification Search
CPC .. H02P 25/032; H02P 8/30; H02P 8/32; H02P 8/38; H02P 8/12; H02P 8/22;
(Continued)

(56) References Cited

U.S. PATENT DOCUMENTS

2015/0028790 A1 1/2015 Qu et al.
2021/0249977 A1 8/2021 Shimada et al.

FOREIGN PATENT DOCUMENTS

JP H09-103094 A 4/1997
JP 2002-078385 A 3/2002
(Continued)

OTHER PUBLICATIONS

"Inoue Shigeyuki, Motor Driving Circuit, Driving Method for the Same and Electronic Equipment Using the Same, Mar. 23, 2017, Clarivate Analytics, pp. 1-24" (Year: 2017).*
(Continued)

*Primary Examiner* — Antony M Paul
(74) *Attorney, Agent, or Firm* — Chrisman Gallo Tochtrop LLC

(57) ABSTRACT

To provide a motor control device, a motor control method and a non-transitory storage medium storing a motor control program for a motor control device, capable of controlling the resting position of a motor with higher accuracy. A motor control device includes:
  a circuit; and
  a digital to analog converter configured to generate a target voltage value, wherein;
  the circuit includes:
    a first adjustment unit configured to adjust a drive signal in a manner that a drive current changes to a target drive current value over a longer time than a period until a motor reaches a target drive position when the drive current is switched to a target drive current value; and
    a second adjustment unit configured to adjust the drive signal in a manner that a overshoots a current value greater than the target drive current value and then returns to the target drive current value.

6 Claims, 9 Drawing Sheets

(58) Field of Classification Search
CPC ... H02P 8/24; H02P 8/08; G05B 2219/37434; G05B 19/102; G01H 17/00
See application file for complete search history.

(56) References Cited

FOREIGN PATENT DOCUMENTS

| | | | |
|---|---|---|---|
| JP | 2008-167579 A | 7/2008 | |
| JP | 2015-023695 A | 2/2015 | |
| JP | 2017060334 A * | 3/2017 | ............... H02P 8/12 |
| JP | 2019-221077 A | 12/2019 | |

OTHER PUBLICATIONS

International Search Report for corresponding International Application No. PCTJP2022/010347 mailed May 24, 2022.
Written Opinion for corresponding International Application No. PCTJP2022/010347 dated May 24, 2022.
International Preliminary Report on Patentability for corresponding International Application No. PCTJP2022/010347 dated Sep. 12, 2023.

* cited by examiner

MOTOR CONTROL DEVICE, MOTOR CONTROL METHOD, AND A NON-TRANSITORY STORAGE MEDIUM STORING A MOTOR CONTROL PROGRAM FOR A MOTOR CONTROL DEVICE

CROSS-REFERENCE TO RELATED APPLICATIONS

This application is a national stage entry of International Application No. PCT/JP2022/010347 filed on Mar. 9, 2022, which claims the benefit of priority to Japanese Application No. JP2021-049016, filed Mar. 23, 2021, the entire disclosures of which are hereby incorporated herein by reference.

TECHNICAL FIELD

The present invention relates to a motor control device, a motor control method, and a non-transitory storage medium storing a motor control program for a motor control device.

BACKGROUND ART

Stepping motors are often adopted as motors used in actuators such as electric sliders and cylinders for reasons such as ease of use and cost. A stepping motor has a predetermined drive amount for each step. A drive device determines the number of steps according to a target drive position and drives the stepping motor by open-loop control.

As a drive technology of a stepping motor, for example, the control method in the motor drive device described in Patent Document 1 is known. In the motor drive device of Patent Document 1, in a constant-current chopper circuit, a pulse-modulated control pulse is generated so that the current flowing through the coil approaches a target current, and the pulse-modulated control pulse is input to the logic circuit. The logic circuit controls the stepping motor in synchronization with the input pulse by logically synthesizing the generated control pulse and the input pulse to generate a drive pulse. The constant-current chopper circuit is configured so that the target current can be adjusted according to the input pulse, thereby improving the current control performance, or the like.

CITATION LIST

Patent Literature

Patent Document 1: JP 2017-60334 A

SUMMARY OF INVENTION

Technical Problem

Since stepping motors vibrate at every driving step, acquiring accurate stop position information may not be possible. For example, when a stepping motor is used for a device such as a chip mounter on an electronic substrate with an actuator repeatedly stopping and driving in a short period, the next driving sequence is started before the vibration is sufficiently damped, thereby resulting in a large gap between the original stop position and the position at the time of reading the position information.

One possible way to avoid this is to suppress the vibration by gradually switching the excitation state with a micro-step drive. However, in the case of gradual switching by a micro-step drive, although the vibration is suppressed, the rotor stops before reaching the original resting position due to the decrease in the moment of inertia of the rotor, and sometimes does not reach the original resting position.

The present invention has been made in view of the above-mentioned problems in the related art, and the subject of the invention is to provide a motor control device, a motor control method, and a motor control program, capable of controlling the resting position of a motor with higher accuracy.

Solution to Problem

To solve the above problem, a motor control device according to one embodiment includes:
a circuit configured to output a drive signal specifying a target drive current value, the target drive current value indicating a drive current provided to a stepping motor in a manner to rotate the stepping motor to a target drive position;
a digital to analog converter configured to generate a target voltage value based on the drive signal;
a comparator configured to output a comparison result between the target voltage value and a voltage value corresponding to the drive current provided to the stepping motor; and
a control signal generation unit configured to generate a control signal controlling the drive current provided to the stepping motor based on the comparison result,
wherein
the circuit includes:
a first adjustment unit configured to adjust the drive signal in a manner that the drive current provided to the stepping motor changes from an initial value to a target drive current value over a longer time than a motor drive reference period, the motor drive reference period being a period until the stepping motor reaches the target drive position when the drive current provided to the stepping motor is instantly switched from the initial value to the target drive current value; and
a second adjustment unit configured to adjust the drive signal in a manner that the drive current provided to the stepping motor overshoots a maximum current value greater than the target drive current value for a predetermined period and then returns to the target drive current value.

Advantageous Effects of Invention

According to the motor control device, motor control method and motor control program of the present invention, it becomes possible to control the resting position of the motor with higher accuracy.

DESCRIPTION OF EMBODIMENTS

1. Overview of Embodiments

Figure 1:
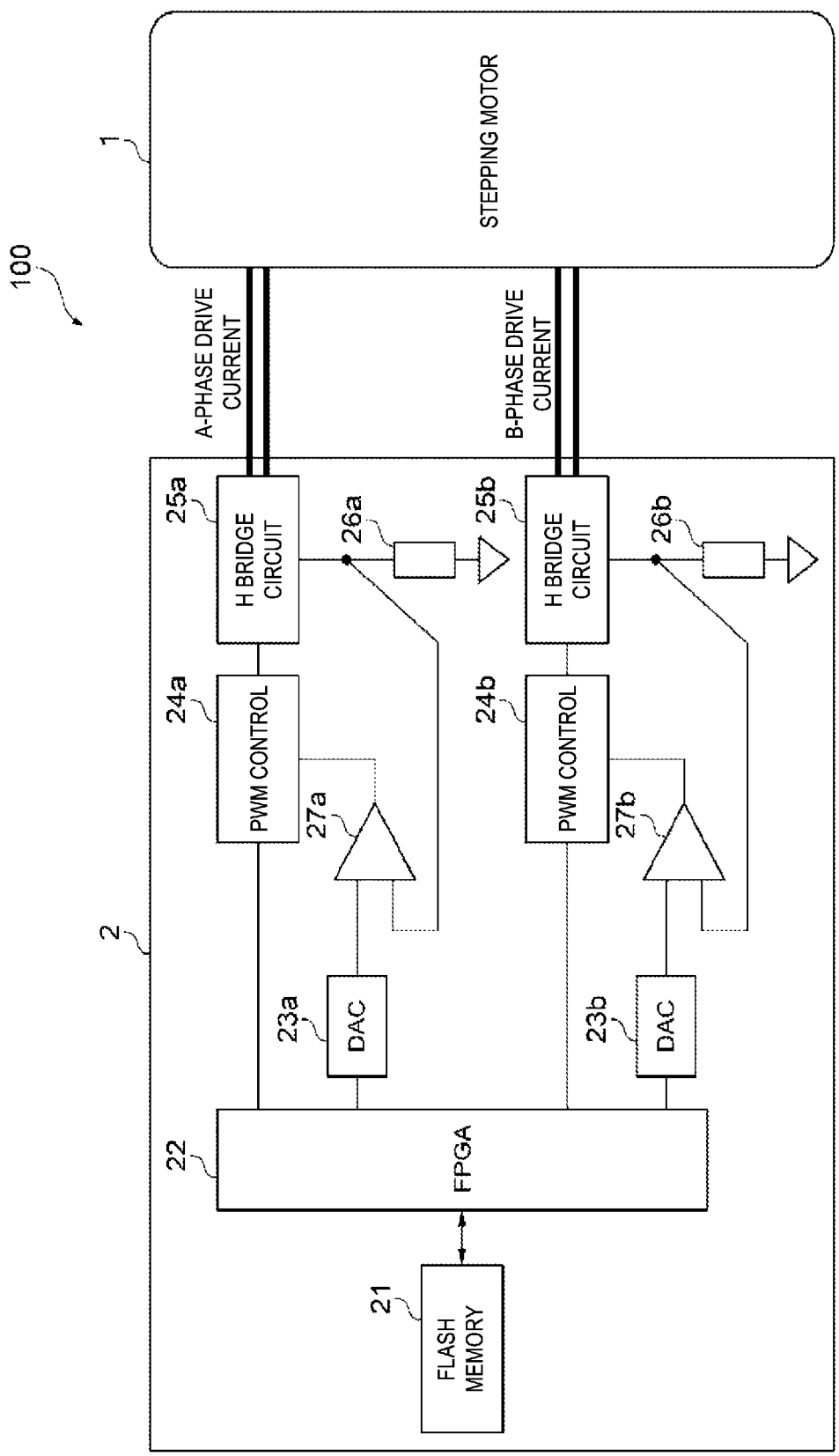
FIG. 1 is a schematic configuration diagram illustrating an example of a motor control system incorporating a motor control device according to an embodiment.

First, an overview will be described of representative embodiments of the invention disclosed in the present application. In the following description, reference signs on the drawings corresponding to the components of the invention are illustrated in parentheses as an example.

(1) A motor control device (2) according to the representative embodiment of the present invention includes:
- a drive signal generation unit (22) configured to output a drive signal specifying a target drive current value, the target drive current value indicating a drive current provided to a stepping motor in a manner to rotate the stepping motor to a target drive position;
- a target voltage value generation unit (23*a*, 23*b*) configured to generate a target voltage value based on the drive signal;
- a comparator (27*a*, 27*b*) configured to output a comparison result between the target voltage value and a voltage value corresponding to the drive current provided to the stepping motor; and
- a control signal generation unit (24*a*, 24*b*) configured to generate a control signal controlling the drive current provided to the stepping motor based on the comparison result, wherein the drive signal generation unit (22) includes:
- a first adjustment unit configured to adjust the drive signal in a manner that the drive current provided to the stepping motor changes from an initial value to a target drive current value over a longer time than a motor drive reference period, the motor drive reference period being a period until the stepping motor reaches the target drive position when the drive current provided to the stepping motor is instantly switched from the initial value to the target drive current value: and
- a second adjustment unit configured to adjust the drive signal in a manner that the drive current provided to the stepping motor overshoots a maximum current value greater than the target drive current value for a predetermined period and then returns to the target drive current value.

(2) In the motor control device according to (1) above, the first adjustment unit and second adjustment unit may adjust the drive signal in a manner that the period to return to the target drive current value after the drive current provided to the stepping motor overshoots from the initial value to the maximum current value greater than the target drive current value does not exceed one drive period.

(3) In the motor control device according to (1) or (2) above, the first adjustment unit and the second adjustment unit may adjust the drive signal in a manner that the drive current provided to the stepping motor includes a portion indicating an S-curve or a step from the initial value to the maximum current value greater than the target drive current value.

(4) In the motor control device according to any one of (1) to (3) above, the second adjustment unit may adjust the drive signal in a manner that the drive current provided to the stepping motor includes a portion indicating an S-curve or a step from the maximum current value greater than the target drive current value to returning to the target drive current value.

(5) The motor control method according to the representative embodiment of the present invention includes:
- outputting a drive signal specifying a target drive current value, the target drive current value indicating a drive current provided to a stepping motor in a manner to rotate the stepping motor to a target drive position;
- generating a target voltage value based on the drive signal;
- outputting a comparison result between the target voltage value and a voltage value corresponding to the drive current provided to the stepping motor; and
- generating a control signal controlling the drive current provided to the stepping motor based on the comparison result, wherein the outputting a drive signal includes:
- adjusting the drive signal in a manner that the drive current provided to the stepping motor changes from an initial value to a target drive current value over a longer time than a motor drive reference period, the motor drive reference period being a period until the stepping motor reaches the target drive position when the drive current provided to the stepping motor is instantly switched from the initial value to the target drive current value: and
- adjusting the drive signal in a manner that the drive current provided to the stepping motor overshoots a maximum current value greater than the target drive current value for a predetermined period and then returns to the target drive current value.

(6) A non-transitory storage medium storing a motor control program according to the representative embodiment of the present invention is a motor control program for a motor control device, the motor control device including:
- a circuit configured to output a drive signal specifying a target drive current value, the target drive current value indicating a drive current provided to a stepping motor in a manner to rotate the stepping motor to a target drive position;
- a digital to analog converter configured to generate a target voltage value based on the drive signal;
- a comparator configured to output a comparison result between the target voltage value and a voltage value corresponding to the drive current provided to the stepping motor; and
- a control signal generation unit configured to generate a control signal controlling the drive current provided to the stepping motor based on the comparison result, wherein the motor control program causes a computer to execute:
- adjusting the drive signal in a manner that the drive current provided to the stepping motor changes from an initial value to a target drive current value over a longer time than a motor drive reference period, the motor drive reference period being a period until the stepping motor reaches the target drive position when the drive current provided to the stepping motor is instantly switched from the initial value to the target drive current value: and
- adjusting the drive signal in a manner that the drive current provided to the stepping motor overshoots a maximum current value greater than the target drive current value for a predetermined period and then returns to the target drive current value.

2. Specific Examples of Embodiments

Specific examples of the embodiments of the present invention will be described below with reference to the drawings. In the following description, components common to the respective embodiments are denoted by the same reference signs, and repeated descriptions are omitted.

A motor control device, a motor control method and a motor control program according to an embodiment will be described by using the drawings.

FIG. 1 is a schematic configuration diagram illustrating an example of a motor control system incorporating a motor control device according to an embodiment. A motor control system 100 includes a stepping motor 1 and a motor control device 2, as illustrated in FIG. 1. As the stepping motor 1, a two-phase stepping motor may be used. This two-phase stepping motor may be a motor configured to rotate the rotor of the motor by a predetermined angle by applying a predetermined drive current to two-phase coils. In the present specification, a rotation of the rotor of the motor is simply referred to as a rotation of the motor.

The motor control device 2 includes a flash memory (Flash Memory) 21, an FPGA (Field Programmable Gate Array) 22, DACs (Digital to Analog Converters) 23a and 23b, PWM (Pulse Width Modulation) control units 24a and 24b, H bridge circuits 25a and 25b, current detection resistors 26a and 26b, and comparators 27a and 27b, as illustrated in FIG. 1. An FPGA 22 is an example of a drive signal generation unit. DACs 23a, 23b are examples of target voltage value generation units. PWM control units 24a, 24b are examples of control signal generation units. The parameters stored in a flash memory 21 include parameters required for control, such as a maximum current value larger than a target drive current value, a predetermined period required to reach a predetermined current value, how a drive current value changes over time, a one drive period, and a resistance value (resistance value of current detection resistors 26a, 26b) for calculating the target voltage value. Details of these parameters are described below. Any storage device such as a ROM (Read Only Memory) may be used with or instead of the flash memory 21. The various parameters stored in the flash memory 21 may be set by the manufacturer before shipment from the factory. The various parameters stored in the flash memory 21 may be set by the engineer (the supplier) after delivery to the user. The various parameters stored in the flash memory 21 may be set by the user after delivery.

The FPGA 22 is a circuit programmed to perform processing to implement various functions based on the parameters stored in the flash memory 21. The FPGA 22 outputs a drive signal specifying a target drive current. This target drive current is a drive current provided to the coil of the stepping motor 1 to rotate the stepping motor 1 to a target drive position.

The DACs 23a, 23b each generates a target voltage value based on a drive signal output from the FPGA 22. The DACs 23a, 23b output the target voltage values to the input terminals of the comparators 27a, 27b, respectively. The target voltage values are the output voltage values of the DACs 23a, 23b adjusted such that the value of the drive current provided to the coil of the stepping motor 1 from a corresponding one of the H bridge circuits 25a, 25b becomes a desired value. The target voltage value can be adjusted to a value obtained by the product of the desired value of the drive current and the resistance value of a corresponding one of the current detection resistors 26a, 26b.

The H bridge circuits 25a, 25b each switch the drive current provided to the coil of the stepping motor 1 and input the voltage corresponding to the current flowing to the coil of the stepping motor 1 to the respective one of the comparators 27a, 27b. The H bridge circuit 25a switches the drive current provided to the A-phase coil in response to the PWM signal input from the PWM control unit 24a. Similarly, the H bridge circuit 25b switches the drive current provided to the B-phase coil in response to the PWM signal input from a PWM control unit 24b.

The H bridge circuits 25a, 25b are grounded via the current detection resistors 26a, 26b, respectively. The input terminals of the comparators 27a, 27b are connected between the H bridge circuits 25a, 25b and the current detection resistors 26a, 26b, respectively.

The current detection resistors 26a, 26b may be each composed of a shunt resistor provided in parallel with an ammeter, for example. Among the voltage values input to the comparators 27a. 27b, the voltage values input from the H bridge circuits 25a. 25b are equal to the voltage values corresponding to the currents flowing through the coil of the stepping motor 1, respectively. The voltage value corresponding to the current flowing through the coil of the stepping motor 1 is the product of the resistance value of the shunt resistor provided as the current detection resistors 26a, 26b and the drive current value flowing through the H bridge circuits 25a, 25b.

The comparators 27a, 27b compare the target voltage values input from the DACs 23a, 23b with the voltage values input from the H bridge circuits 25a, 25b and output binary output values according to the comparison result, respectively. The binary output values are High (1) and Low (0).

Specifically, the inversion terminals of the comparators 27a, 27b receive waveforms of the coil voltage values, respectively, the coil voltage value being the voltage value corresponding to the current flowing through the coil of the stepping motor 1. The waveforms of the target voltage values output from the DACs are input to the non-inversion terminals of the comparators 27a, 27b, respectively. The comparators 27a, 27b output the output values of High (1) when the coil voltage values are smaller than the target voltage values, respectively. The comparators 27a, 27b output the output values of Low (0) when the coil voltage values are greater than the target voltage values, respectively. The comparators 27a, 27b do not output the output values when the coil voltage values are equal to the target voltage values, respectively. The comparators 27a, 27b output rectangular waves of "1" and "0" when necessary according to the relationship between the coil voltage values and the target voltage values, respectively.

The PWM control units 24a, 24b adjust the duty ratios of the drive pulses from the FPGA 22 according to the binary output values input from the comparators 27a, 27b to generate PWM signals, respectively. When "1" is output from the comparators 27a, 27b, because the drive current is small, a respective one of the PWM control units 24a, 24b generates a PWM signal with an increased duty ratio in order to increase the drive current provided to the coil of the stepping motor 1. When "0" is output from the comparators 27a, 27b, because the drive current is great, a respective one of the PWM control units 24a, 24b generates a PWM signal with a decreased duty ratio in order to reduce the drive current provided to the coil of the stepping motor 1.

In this way, the motor control device 2 can control the drive current provided to the coil of the stepping motor 1 based on the drive signal output from the FPGA 22. Here, the FPGA 22 inputting the drive signals to the DACs 23a, 23b will be described further.

Figure 2:
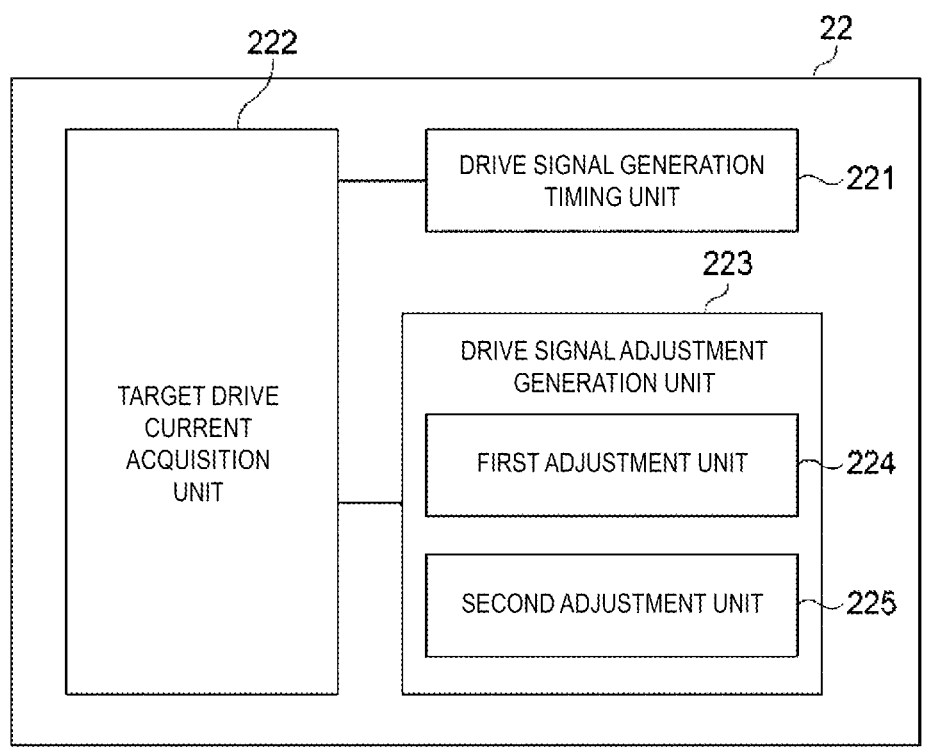
FIG. 2 is a diagram illustrating an example of a configuration of a functional block in an FPGA of a motor drive device.

FIG. 2 is a diagram illustrating an example of the configuration of a functional block in the FPGA of the motor drive device.

The FPGA 22 is programmed to include a drive signal generation timing unit 221, a target drive current acquisition unit 222 and a drive signal adjustment generation unit 223, as functional units, as illustrated in FIG. 2.

The drive signal generation timing unit 221 determines a generation timing of the drive signal and notifies the target drive current acquisition unit 222 that the generation timing of the drive signal has come. The drive signal generation timing unit 221 outputs drive pulses to the PWM control units 24a, 24b as required.

The target drive current acquisition unit 222, when receiving the notification that the generation timing of the drive signal has come, acquires parameters, required for control, such as the target drive current value from the flash memory 21, and passes the parameters to the drive signal adjustment generation unit 223. The target drive current value is a value indicating the magnitude of the drive current provided to the stepping motor 1 so that the stepping motor 1 rotates to the target drive position. That is, the current value flowing through the coil of the stepping motor 1 when the stepping motor 1 is driven and finally moved to the target position is the target drive current value.

The drive signal adjustment generation unit 223, when receiving parameters required for control, such as the target drive current value, generates a drive signal. The drive signal adjustment generation unit 223 generates a drive signal adjusted so that the drive current provided to the coil of the stepping motor 1 makes a desired change. The desired change is that the drive current provided to the coil of the stepping motor 1 changes according to parameters such as the target drive current value, or according to elapsed time. How the drive current value changes over time will be described later. The drive signal adjustment generation unit 223 includes a first adjustment unit 224 and a second adjustment unit 225.

The first adjustment unit 224 adjusts the drive signal so that the drive current provided to the coil of the stepping motor 1 changes from an initial value to the target drive current value over a longer time than a motor drive reference period. The motor drive reference period is a period required for the stepping motor 1 to reach the target drive position when the drive current provided to the coil is instantly switched to the target drive current.

The motor drive reference period will be described here.

Figure 3:
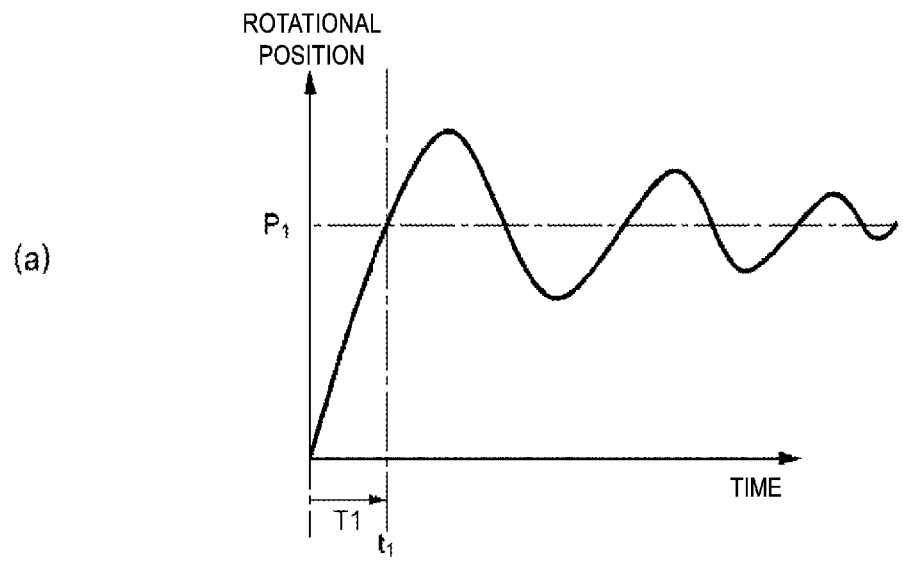
FIG. 3 is a diagram illustrating a motor drive reference period.
Figure 3:
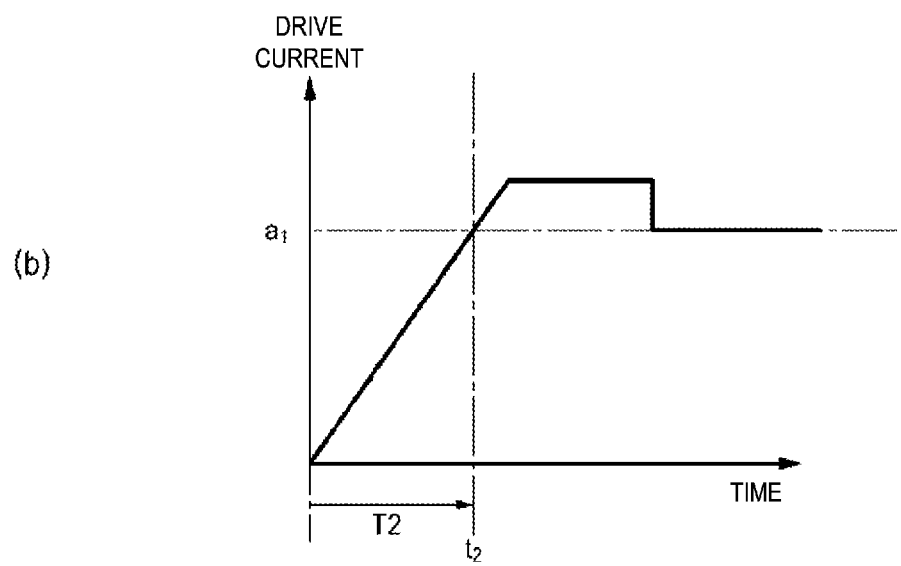

FIG. 3 is a diagram illustrating the motor drive reference period. FIG. 3(a) illustrates the rotational position over time when the drive current provided to the coil of the stepping motor 1 is instantly switched from the initial value to the target drive current. FIG. 3(b) illustrates the change in the drive current provided to the coil of the stepping motor 1 according to the drive signal generated by the drive signal adjustment generation unit 223 over time.

When the drive current provided to the coil is instantly switched from the initial value to the target drive current at time 0, the stepping motor 1 reaches a target drive position P1 at time $t_1$, as illustrated in FIG. 3(a). The target drive position P1 is a target position to be finally moved to by the stepping motor 1. The stepping motor 1 is driven by flowing a target drive current through the coil of the stepping motor 1 to finally move to the target position. However, the stepping motor 1 rotates beyond the target drive position P1. The stepping motor 1 further exceeds the target drive position P1 by reversing after exceeding the target drive position P1. Thus, the stepping motor 1 comes to rest after repeated vibrations passing through the target drive position P1. In the present specification, a period T1 defined by the time $t_1$ from the time 0 when the drive current provided to the coil is switched to the target drive current to the time when the target drive position P1 is first reached, is called a motor drive reference period.

The first adjustment unit 224 adjusts the drive signal so that the drive current provided to the coil of the stepping motor 1 gradually changes to become the target drive current value $a_1$ over a long period T2 from time 0 to time $t_2$ after time $t_1$ when having reached the motor drive reference period T1. With this configuration, the vibration generated when the stepping motor 1 stops, can be suppressed.

The second adjustment unit 225 adjusts the drive signal so that the drive current provided to the coil of the stepping motor 1 overshoots to a maximum current value greater than the target drive current value and is held for a predetermined period and then returns to the target drive current value. The predetermined time for holding the overshot current value is determined by using the value stored in the flash memory 21 as a "predetermined period required to reach a predetermined current value".

The first adjustment unit 224 and the second adjustment unit 225 adjust the drive current so that a period for the drive current to overshoot from the initial value and return to the target drive current value does not take longer than one drive period. The one drive period is a time set as the time to drive based on one target drive current. For one drive period, for example, the value stored in the flash memory 21 is used as the initial value of the stepping motor 1.

At the drive signal adjustment generation unit 223, the first adjustment unit 224 and the second adjustment unit can adjust the drive signal input to the DAC 23 so that the output of the DAC 23 has the desired voltage value. The first adjustment unit 224 and the second adjustment unit 225 vary the drive current provided to the coil of the stepping motor 1 by adjusting the drive signal. The period for varying the drive current provided to the coil of the stepping motor 1 is preset as a "predetermined period required to reach a predetermined current value". Four periods of time, for example, are set as "predetermined period required to reach a predetermined current value": (1) a period required to reach a target drive current value from an initial value; (2) a period required to reach a maximum current value greater than a target drive current value from when reaching the target drive current value; (3) a period required to reach when the predetermined period of the overshoot elapses from when reaching the maximum current value greater than the target drive current value; and (4) a period required to reach the target current value from when the predetermined time of the overshoot elapses.

Among the "predetermined period required to reach a predetermined current value", (1) the period required to reach the target drive current value from the initial value must be set to a period longer than the motor drive reference period. In addition, among the aforementioned "predetermined period required to reach a predetermined current value", the total period from (1) to (4) must be set so that the total time does not exceed one drive period.

The "predetermined period required to reach a predetermined current value" is stored in the flash memory 21 as a parameter required for control. Here, the relationship between the DAC output and the drive current based on the drive signal generated by the drive signal adjustment generation unit 223 will be described.

Figure 4:
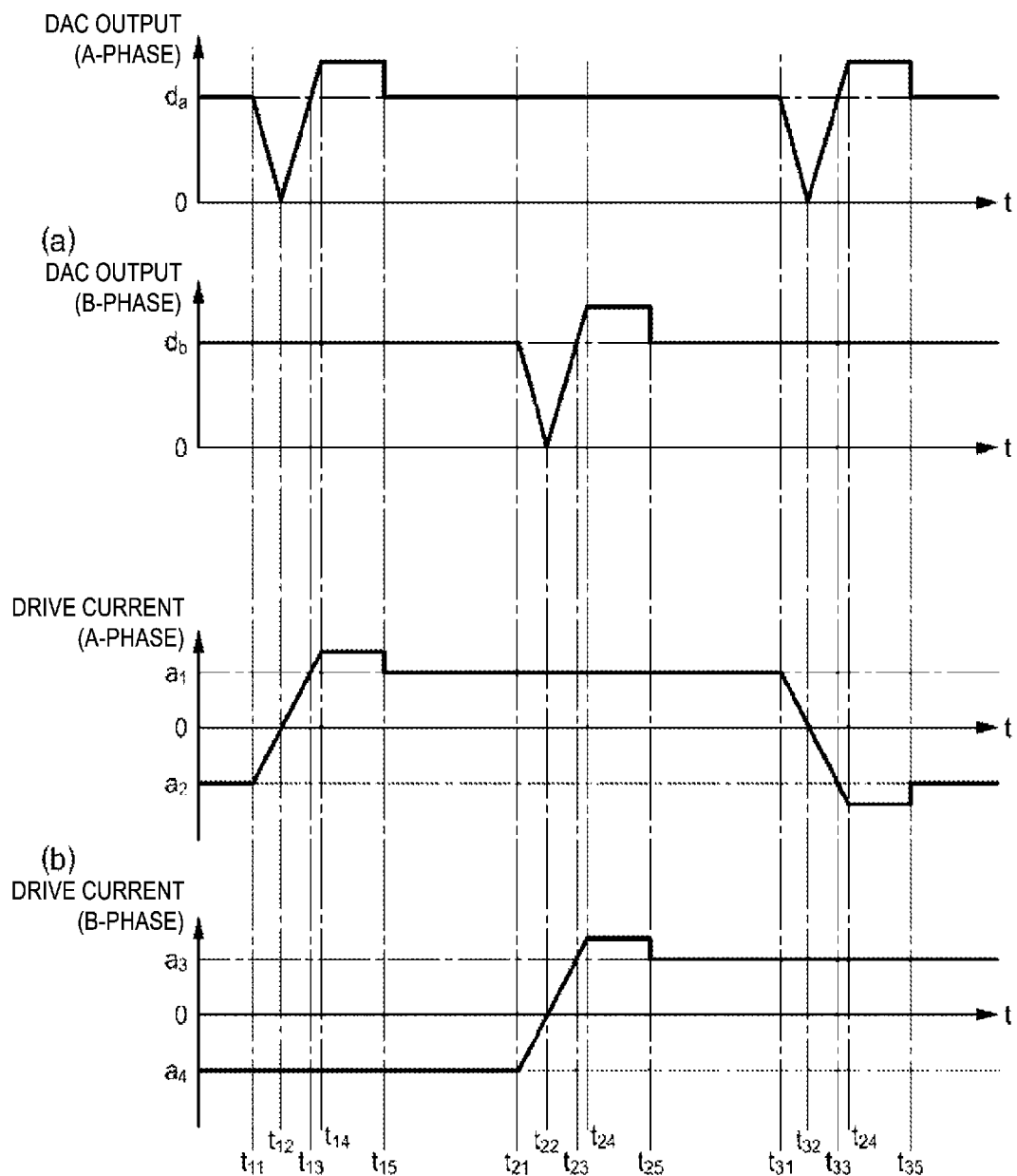
FIG. 4 is a diagram illustrating a transition between a voltage value at a DAC output and a drive current provided to a coil.

FIG. 4 is a diagram illustrating the transition between the voltage value at the DAC output based on the adjusted drive signal and the drive current provided to the coil. FIG. 4(a) illustrates the transition of the voltage values at the DAC output over time. FIG. 4(b) illustrates the transition of the drive current over time.

In FIG. 4(a), the upper part illustrates the transition of the output voltage value of the DAC 23a. In FIG. 4(a), the lower part illustrates the transition of the output voltage value of the DAC 23b. In FIG. 4(a), da and de denote the voltage values of the DACs 23a, 23b corresponding to the target drive currents, respectively. In FIG. 4(b), the upper part illustrates the transition of the drive current provided to the A-phase coil. In FIG. 4(b), the lower part illustrates the transition of the drive current provided to the B-phase coil. In FIG. 4(b), $a_1$ and $a_2$ each illustrates the target drive current of the A-phase. In FIG. 4(b), $a_3$ and $a_4$ each illustrates the target drive current of the B-phase. Additionally, $a_2$ and $a_4$ are negative values.

First Interval: $t_{11}$ to $t_{12}$

Based on the drive signal input from the FPGA 22, the output voltage value of the DAC 23a first decreases from time $t_{11}$. Then, the output voltage value of the DAC 23a becomes "0" at time $t_{12}$. In this process, the target voltage value output from the DAC 23a becomes lower than the coil voltage value, so that the comparator 27a outputs "0". As a result, the PWM control unit 24a controls to reduce the drive current provided to the A-phase coil of the stepping motor 1. In response to the control of the PWM control unit 24a, the absolute value of the A-phase drive current of the stepping motor 1 decreases to 0.

Second Interval: $t_{12}$ to $t_{13}$

Based on the drive signal input from the FPGA 22, the output voltage value of the DAC 23a becomes "0" at time $t_{12}$, and then rises. In this process, the target voltage value output from the DAC 23a is considered to be larger than the coil voltage value, so that the comparator 27a outputs "1". As a result, the PWM control unit 24a controls to increase the drive current provided to the A-phase coil of the stepping motor 1. In response to the control of the PWM control unit 24a, the drive current of the A-phase of the stepping motor 1 rises.

Third Interval: $t_{13}$ to $t_{14}$

Based on the drive signal input from the FPGA 22, the output voltage value of the DAC 23a rises even after reaching the voltage value indicating the target drive current at time $t_{13}$. Even in this process, the target voltage value output from the DAC 23a is considered to be smaller than the coil voltage value, so that the comparator 27a outputs "1". As a result, the PWM control unit 24a controls to increase the drive current provided to the A-phase coil of the stepping motor 1. In response to the control of the PWM control unit 24a, the drive current of the A-phase of the stepping motor 1 rises.

Fourth Interval: $t_{14}$ to $t_{15}$

Based on the drive signal input from the FPGA 22, the output voltage value of the DAC 23a rises until time $t_{14}$. At the time $t_{14}$, the drive current of the A-phase indicates the maximum current value greater than the target drive current value. The output voltage value of the DAC 23a holds for a predetermined period from the time $t_{14}$ to time $t_{15}$. In this process, the target voltage value output from the DAC 23a and the coil voltage value are considered to be equal, so that the comparator 27a does not output. As a result, the PWM control unit 24a controls to maintain the drive current provided to the A-phase coil of the stepping motor 1. In response to the control of the PWM control unit 24a, the A-phase drive current of the stepping motor 1 is maintained.

End of Fourth Interval: $t_{15}$

Based on the drive signal input from the FPGA 22, the output voltage value of the DAC 23a returns to the voltage value indicating the target drive current at time $t_{15}$. In this process, the target voltage value output from the DAC 23a is considered to be smaller than the coil voltage value, so that the comparator 27a outputs "0". As a result, the PWM control unit 24a controls the drive current provided to the A-phase coil of the stepping motor 1 to reduce to the target drive current. In response to the control of the PWM control unit 24a, the drive current of the A-phase of the stepping motor 1 decreases to the target drive current.

The drive signal adjustment generation unit 223 of the FPGA 22 generates a drive signal during one drive period so that the output voltage value of the DAC 23a is adjusted to indicate the variation of the above first to fourth intervals. The period from the start of the first interval to the end of the second interval corresponds to (1) the period required to reach the target drive current value from the initial value. The third interval corresponds to (2) the period required from reaching the target drive current value to the maximum current value greater than the target drive current value. The fourth interval corresponds to (3) a period required from reaching the maximum current value greater than the target drive current value to the elapse of a predetermined period of overshoot. These predetermined periods are determined by using the values stored in the flash memory 21 as the "predetermined period required to reach a predetermined current value". The drive signal adjustment generation unit 223 determines the start time and end time of each interval of such as the first to fourth intervals, by using the values stored in the flash memory 21 as the "predetermined period required to reach a predetermined current value".

Even during the next drive period, as illustrated in FIG. 4(a), based on the drive signal input from the FPGA 22, the output voltage value of the DAC 23b varies similarly to the output voltage value of the DAC 23a from $t_1$ to $t_{15}$ at the next timing $t_{21}$ to $t_{25}$. According to the variation in the output voltage value of the DAC 23b, the PWM control unit 24b controls the drive current provided to the B-phase coil of the stepping motor 1 so as to make the desired change. Depending on the control of the PWM control unit 24b, the drive current of the B-phase of the stepping motor 1 varies as illustrated in FIG. 4(b).

Furthermore, even during the next drive period, as illustrated in FIG. 4(a), based on the drive signal input from the FPGA 22, the output voltage value of the DAC 23a varies similarly to the output voltage value of the DAC 23a from $t_{11}$ to $t_{15}$ at the next $t_{31}$ to $t_{35}$ timing. According to variations in the output of the DAC 23a, the PWM control unit 24a controls the drive current provided to the A-phase coil of the stepping motor 1 so as to make the desired change. Depending on the control of the PWM control unit 24a, the drive current of the A-phase of the stepping motor 1 varies as illustrated from $t_{31}$ to $t_{35}$ in FIG. 4(a). At this time, as illustrated from $t_{31}$ to $t_{35}$ in FIG. 4(a), the PWM control unit 24a varies the drive current of the A-phase of the stepping motor 1 in the opposite phase from the phase between $t_{11}$ to $t_{15}$ based on the drive pulse.

In the example of FIG. 4, how the drive current changes is described as linearly, but the pattern of change is not limited to this. How the drive current value changes over time will be described by using FIGS. 5 to 7. How the drive current value changes over time is stored in the flash memory 21 as one of the parameters required for control.

Figure 5:
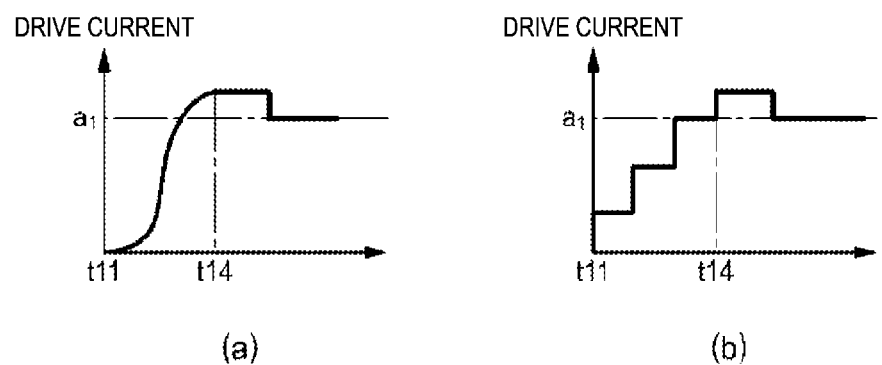
FIG. 5 is a diagram illustrating an example of how a drive current value changes over time.
Figure 6:
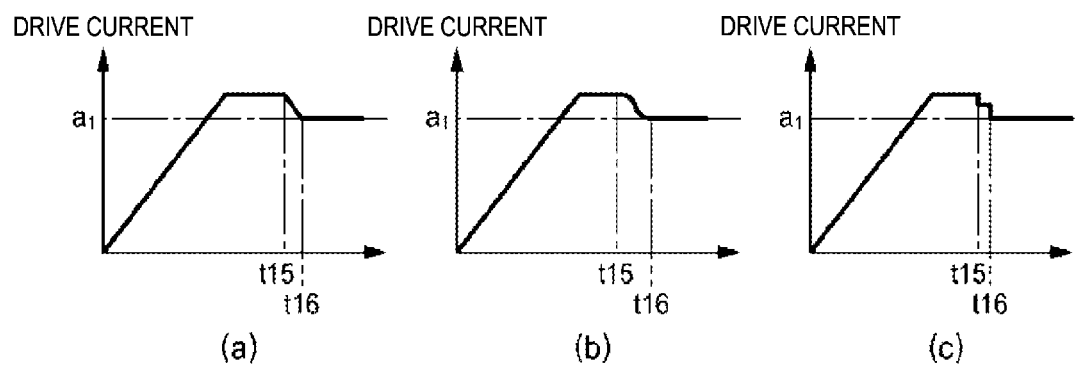
FIG. 6 is a diagram illustrating an example of how a drive current value changes over time.
Figure 7:
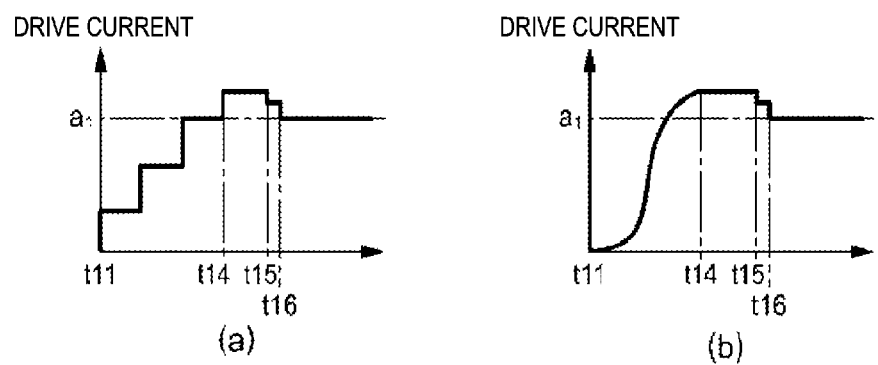
FIG. 7 is a diagram illustrating an example of how a drive current value changes over time.

FIGS. 5 to 7 are diagrams illustrating how the drive current value provided to the coil of the motor changes over time. The drive current provided to the coil of the motor may vary in an inclined, S-shaped, or stepped manner as illustrated in FIGS. 5 to 7. FIG. 5 illustrates how the drive current value provided to the coil of the motor changes over time in the first to third intervals. FIG. 5(a) illustrates an S-shaped change from the start time $t_{11}$ in the first interval to the end time $t_{14}$ in the third interval. FIG. 5(b) illustrates a stepwise change from the start time $t_{11}$ in the first interval to the end time $t_{14}$ in the third interval.

FIG. 6 is a diagram illustrating an example of how the drive current value provided to the coil of the motor changes over time in the fifth interval after the fourth interval. FIG. 6(a) illustrates an inclined change in the fifth interval (from the time $t_{15}$ to the time $t_{16}$). FIG. 6(b) illustrates an S-shaped change in the fifth interval (from the time $t_{15}$ to the time $t_{16}$). FIG. 6(c) illustrates a stepwise change in the fifth interval (from the time $t_{15}$ to the time $t_{16}$).

The fifth interval can be determined by using the value stored in the flash memory 21 as (4) the "period required to reach a target current value after a predetermined period of overshoot" among the "predetermined period required to reach a predetermined current value".

FIG. 7 illustrates how the drive current value provided to the motor coil changes over time from the first interval start time $t_{11}$ to the third interval end time $t_{14}$ and in the fifth interval (time $t_{15}$ to time $t_{16}$). In FIG. 7(a), the change is made stepwise from the start time $t_{11}$ in the first interval to the end time $t_{14}$ in the third interval, and also made stepwise in the fifth interval (from time $t_{15}$ to time $t_{16}$). In FIG. 7(b), the change is made in an S-shape from the start time $t_{11}$ in the first interval to the end time $t_{14}$ in the third interval, and also made stepwise in the fifth interval (from time $t_{15}$ to time $t_{16}$).

The drive signal adjustment generation unit 223 of the FPGA 22 can generate a drive signal changing the output voltage value of the DAC 23a so that the drive current provided to the coil of the motor becomes a mode of the drive current described above.

Next, the operation of the FPGA for generating a drive signal to change the respective output voltage values of the DACs 23a, 23b as described above will be described.

Figure 8:
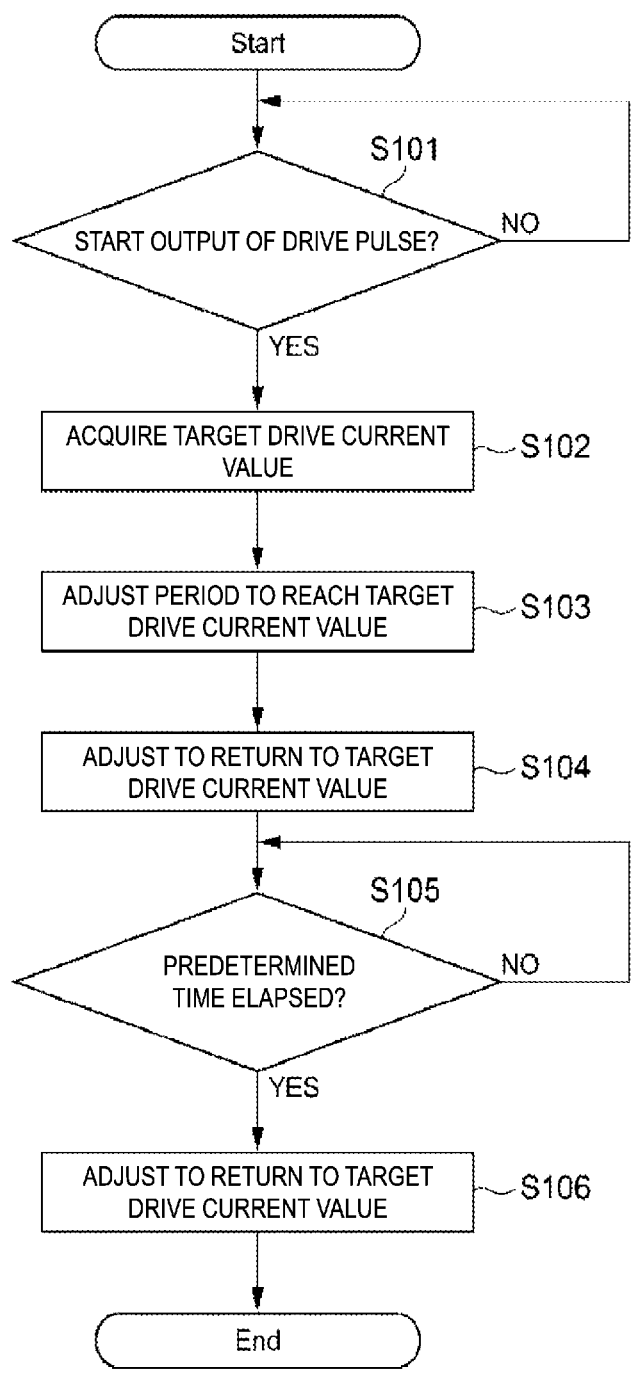
FIG. 8 is a flowchart illustrating an operation of an FPGA.

FIG. 8 is a flowchart illustrating an operation of the FPGA.

At the drive signal generation timing unit 221, whether to start outputting the drive pulse is determined (step S101). Upon determining to start outputting the drive pulse (step S101: YES), the target drive current acquisition unit 222 acquires parameters such as the target drive current (step S102). The target drive current acquisition unit 222 passes the acquired parameters such as the target drive current to the drive signal adjustment generation unit 223.

The drive signal adjustment generation unit 223, when receiving parameters such as a target drive current, generates a drive signal adjusting the time to reach the target drive current value to be longer than the motor drive reference period at the first adjustment unit 224 (step S103). With this drive signal, the output voltage value of the DAC 23a varies as illustrated from $t_{11}$ to $t_{13}$ in FIG. 4.

After generating a drive signal reaching the target drive current value, the drive signal adjustment generation unit 223 generates a drive signal adjusted to reach a maximum current value greater than the target drive current value at the second adjustment unit (step S104). With this drive signal, the output voltage value of the DAC 23a varies as illustrated from $t_{13}$ to $t_{14}$ in FIG. 4.

After the drive signal adjustment generation unit 223 generates a drive signal reaching the maximum current value greater than the target drive current value, the second adjustment unit determines whether a predetermined period has elapsed since reaching the maximum current value greater than the target drive current value (step S105). The second adjustment unit, when unable to determine that the predetermined period has elapsed (step S105: NO), periodically repeats the determination of step S105 and generates a drive signal adjusted to maintain the maximum current value greater than the target drive current value until determining that the predetermined period has elapsed. With this drive signal, the output voltage value of the DAC 23a maintains a constant value as illustrated from $t_{14}$ to $t_{15}$ in FIG. 4.

The second adjustment unit, when determining that the predetermined period has elapsed (step S105: YES), adjusts the current value back to the target drive current value (step S106). With this drive signal, the output voltage value of the DAC 23a varies as illustrated at $t_{15}$ in FIG. 4.

Figure 9:
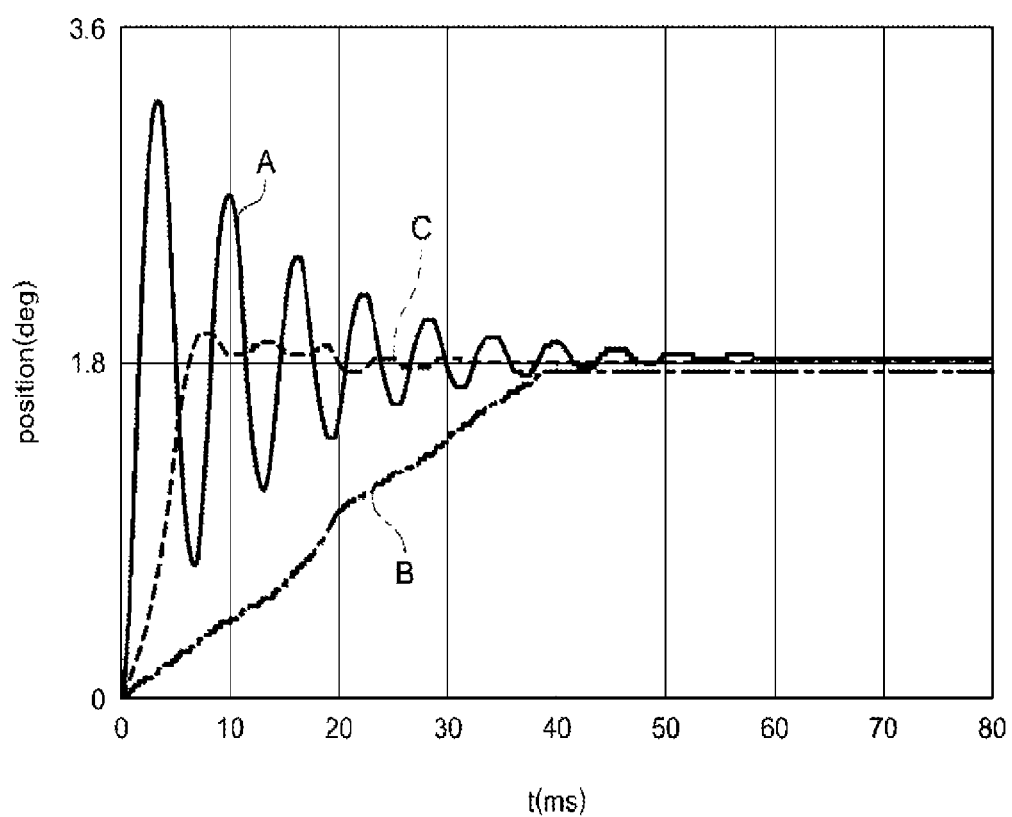
FIG. 9 is a diagram illustrating a variation of a stop position due to a control method of a drive current.

FIG. 9 is a diagram illustrating the position variation from the drive to stop in each control method of the drive current. In FIG. 9, the target drive position is at 1.8 (deg). A curve A illustrates the variation when the drive current is controlled by full-step drive. A curve B illustrates the variation when the drive current is controlled by microstep drive. A curve C illustrates the variation when the drive current is controlled by the drive method of the present embodiment.

In the example illustrated in FIG. 9, the stop position of the curve A is at 1.91 (deg). The error between the reading position of the curve A and the target stop position is +0.11 (deg). The stop position of the curve B is at 1.75 (deg). The error between the reading position of the curve B and the target stop position is −0.05 (deg). The stop position of the curve C is at 1.80 (deg). The error between the reading position of the curve C and the target stop position is 0.00 (deg).

As illustrated in FIG. 9, the curve A indicating full-step drive vibrates greatly, takes a long time to stop, and does not completely stop by the time of reading the position information. On the other hand, the curve B indicating the micro-step drive stops completely at the time of reading the position information, but stops before reaching the target drive position due to insufficient torque. In comparison, the curve C indicating the drive method of the present embodiment stops completely at the time of reading the position information, and stops at the target drive position. Thus, according to the motor control device, the motor control system and the motor control method of the present embodiments, it is possible to suppress the influence of both the vibration generated at each step and the moment of inertia of the rotor, and to rest with a high accuracy.

Modification of Embodiments

In the above embodiments, a specific example is described by using the motor control system of the configuration illustrated in FIG. 1, but embodiments are not limited to the configuration illustrated in FIG. 1. Similarly, the configuration of the stepping motor 1 and the motor control device 2 are not specifically limited to the examples described.

For example, the FPGA 22 may instead be configured by a program processing device (e.g., microcontroller: MCU). The program processing device may include hardware elements such as a processor such as CPU, various memories such as ROM and RAM, a timer (counter), an A/D conversion circuit, an input/output I/F circuit, and a clock generation circuit, with each component being connected to each other via a bus or a dedicated line. In this case, the processor of the program processing device performs various operations according to the programs stored in the flash memory 21 such as a memory, and controls peripheral circuits such as the A/D conversion circuit and the input/output I/F circuit, thereby achieving the configuration of each functional part illustrated in FIG. 2.

In the above embodiments, the transitions between the voltage value and the drive current in the DAC output illustrated in FIG. 4 are specific examples, and the modes of the transition are not limited to these examples.

In the above embodiments, the processing flow of the FPGA illustrated in FIG. 8 is a specific example, and the processing flow is not limited to these embodiments.

REFERENCE SIGNS LIST

1 Stepping motor; 2 Motor control device; 21 Flash memory; 22 FPGA; 23a, 23b DAC; 24a. 24b PWM control unit; 25a, 25b H bridge circuit; 26a, 26b Current detection resistor; 27a, 27b Comparator; 221 Drive signal generation timing unit; 222 Target drive current acquisition unit; 223 Drive signal adjustment generation unit; 224 First adjustment unit; 225 Second adjustment unit: 100 Motor control system

The invention claimed is:

1. A motor control device, comprising:
a circuit configured to output a drive signal specifying a target drive current value, the target drive current value indicating a drive current provided to a stepping motor in a manner to rotate the stepping motor to a target drive position;
a digital to analog converter configured to generate a target voltage value based on the drive signal;
a comparator configured to output a comparison result between the target voltage value and a voltage value corresponding to the drive current provided to the stepping motor; and
a control signal generation unit configured to generate a control signal controlling the drive current provided to the stepping motor based on the comparison result, wherein
the circuit includes:
a first adjustment unit configured to adjust the drive signal in a manner that the drive current provided to the stepping motor changes from an initial value to a target drive current value over a longer time than a motor drive reference period, the motor drive reference period being a period until the stepping motor reaches the target drive position when the drive current provided to the stepping motor is instantly switched from the initial value to the target drive current value; and
a second adjustment unit configured to adjust the drive signal in a manner that the drive current provided to the stepping motor overshoots a maximum current value greater than the target drive current value for a predetermined period and then returns to the target drive current value.

2. The motor control device according to claim 1, wherein the first adjustment unit and the second adjustment unit adjust the drive signal in a manner that the period to return to the target drive current value after the drive current provided to the stepping motor overshoots from the initial value to the maximum current value greater than the target drive current value does not exceed one drive period.

3. The motor control device according to claim 1, wherein the first adjustment unit and the second adjustment unit adjust the drive signal in a manner that the drive current provided to the stepping motor includes a portion indicating an S-curve or a step from the initial value to the maximum current value greater than the target drive current value.

4. The motor control device according to claim 1, wherein the second adjustment unit adjusts the drive signal in a manner that the drive current provided to the stepping motor includes a portion indicating an S-curve or a step from the maximum current value greater than the target drive current value to returning to the target drive current value.

5. A motor control method, comprising:
outputting a drive signal specifying a target drive current value, the target drive current value indicating a drive current provided to a stepping motor in a manner to rotate the stepping motor to a target drive position;
generating a target voltage value based on the drive signal;
outputting a comparison result between the target voltage value and a voltage value corresponding to the drive current provided to the stepping motor; and
generating a control signal controlling the drive current provided to the stepping motor based on the comparison result, wherein
the outputting a drive signal includes:
adjusting the drive signal in a manner that the drive current provided to the stepping motor changes from an initial value to a target drive current value over a longer time than a motor drive reference period, the motor drive reference period being a period until the stepping motor reaches the target drive position when the drive current provided to the stepping motor is instantly switched from the initial value to the target drive current value: and
adjusting the drive signal in a manner that the drive current provided to the stepping motor overshoots a maximum current value greater than the target drive current value for a predetermined period and then returns to the target drive current value.

6. A non-transitory storage medium storing a motor control program for a motor control device, the motor control device including:
a circuit configured to output a drive signal specifying a target drive current value, the target drive current value indicating a drive current provided to a stepping motor in a manner to rotate the stepping motor to a target drive position;
a digital to analog converter configured to generate a target voltage value based on the drive signal;
a comparator configured to output a comparison result between the target voltage value and a voltage value corresponding to the drive current provided to the stepping motor; and
a control signal generation unit configured to generate a control signal controlling the drive current provided to the stepping motor based on the comparison result, wherein
the motor control program causes a computer to execute:
adjusting the drive signal in a manner that the drive current provided to the stepping motor changes from an initial value to a target drive current value over a longer time than a motor drive reference period, the motor drive reference period being a period until the stepping motor reaches the target drive position when the drive current provided to the stepping motor is instantly switched from the initial value to the target drive current value: and adjusting the drive signal in a manner that the drive current provided to the stepping motor overshoots a maximum current value greater than the target drive current value for a predetermined period and then returns to the target drive current value.

\* \* \* \* \*